(12) United States Patent
Atkins

(10) Patent No.: US 7,104,360 B2
(45) Date of Patent: Sep. 12, 2006

(54) MOBILE ELEVATING HUT

(76) Inventor: Charlie Atkins, 8616 W. 45th Pl., Lyons, IL (US) 60534

( * ) Notice: Subject to any disclaimer, the term of this patent is extended or adjusted under 35 U.S.C. 154(b) by 0 days.

(21) Appl. No.: 11/389,807

(22) Filed: Mar. 27, 2006

(65) Prior Publication Data

US 2006/0162999 A1    Jul. 27, 2006

Related U.S. Application Data

(63) Continuation-in-part of application No. 10/695,034, filed on Oct. 28, 2003, which is a continuation-in-part of application No. 09/957,010, filed on Sep. 20, 2001, now abandoned.

(51) Int. Cl.
*E04C 5/00* (2006.01)
(52) U.S. Cl. .................... 182/69.2; 182/63.1; 182/127
(58) Field of Classification Search ............... 182/63.1, 182/69.5, 69.6, 68.2, 69.1, 127
See application file for complete search history.

(56) References Cited

U.S. PATENT DOCUMENTS

| 228,647 A | 6/1880 | King |
|---|---|---|
| 261,874 A | 8/1882 | Rich |
| 445,487 A | 1/1891 | Arnold |
| 1,718,979 A | 7/1929 | Protzeller |
| 2,600,807 A | 6/1952 | Rieser |
| 3,406,784 A | 10/1968 | Jones |
| 3,882,964 A | 5/1975 | Schellenberg |
| 4,442,919 A | 4/1984 | Fulcher |
| 4,719,716 A | 1/1988 | Chrisely |
| 5,280,879 A * | 1/1994 | Kreuter ................. 254/333 |
| 5,295,555 A | 3/1994 | Strange |
| 5,564,523 A | 10/1996 | Howard |
| 6,347,684 B1 | 2/2002 | Fath |
| 2003/0000769 A1 | 1/2003 | Pyle |

* cited by examiner

*Primary Examiner*—Alvin Chin-Shue
(74) *Attorney, Agent, or Firm*—David J. Bremer

(57) ABSTRACT

A mobile elevating hut product, which has a trailer, a platform, legs connecting the platform and the trailer, and a lifter for sequentially and repeatably moving the platform to and from a raised position. The trailer enables the product to be moved to different locations and set up with the platform in the raised position. The platform in the raised position is fully supported by the legs. The fully supported platform is resistant to accidental and unexpected lowering caused by transient events. The platform in the raised position provides an elevated lookout perch for work, recreation, and other purposes.

8 Claims, 2 Drawing Sheets

MOBILE ELEVATING HUT

The mobile elevating hut product 10 comprises a trailer, a platform, legs connecting the trailer to the platform, and a lifter to move the platform to and from a raised position. The platform in the raised position is fully supported by the legs, so that energy from the lifter is not required to maintain the platform in the raised position.

By supporting the platform with the legs rather than the lifter, the product in the raised position is structurally simplified and the safety and reliability of the product is enhanced. The platform can remain in the raised position for long periods with less chance of mechanical failure and power failure causing unexpected and accidental lowering of the platform.

With the platform in the raised position, the product can provide a stable, elevated lookout perch. The product can be used for various purposes, such as to spot wildlife for photography and hunting, as a secure shelter, and as a work platform.

The product provides progress over the prior art shown for example in U.S. Pat. Nos. 228,647 by KING; 261,874 by RICH; 445,487 by ARNOLD; 2,600,807 by RIESER; 3,406,784 by JONES;3,82,964 by SCHELLENBERG; 3,882,964 by SCHELLENBERG; 4,442,919 BY FULCHER; 4,719,716 by CHRISLEY; 5,295,555 by STRANGE; 5,564,523 by HOWARD; and 6,347,684 by FATH.

The product comprises a trailer so that the product can be moved to remote and other locations. At a location, the trailer can be leveled to accommodate uneven terrain. The platform can be moved to a raised position to provide enhanced views of the surroundings, to isolate the platform from the surroundings, and to provide an elevated site for work, recreation, and other purposes.

The trailer has a frame 31. The trailer can have a hitch 32 at one end for connecting to a tow vehicle.

The trailer enables the product to be transported to remote locations. The platform can be moved, sequentially and repeatably, to and from the raised position to facilitate transporting the product to different locations.

Trailer mobility can be provided by wheels, such as a wheel 33, and by various other means such as runners, skis, tracks, and combinations of these and other means.

The trailer can have various leveling components, such as a screw jack 34, for leveling the trailer on uneven ground. Alternatively, the leveling components can be scissors jacks, hydraulic jacks, various levers and wedges, and combinations thereof, so long as they provide the leveling function required to level the trailer. The leveling components can be collapsible, retractable, and removable for stowing during transport.

Figure 1:
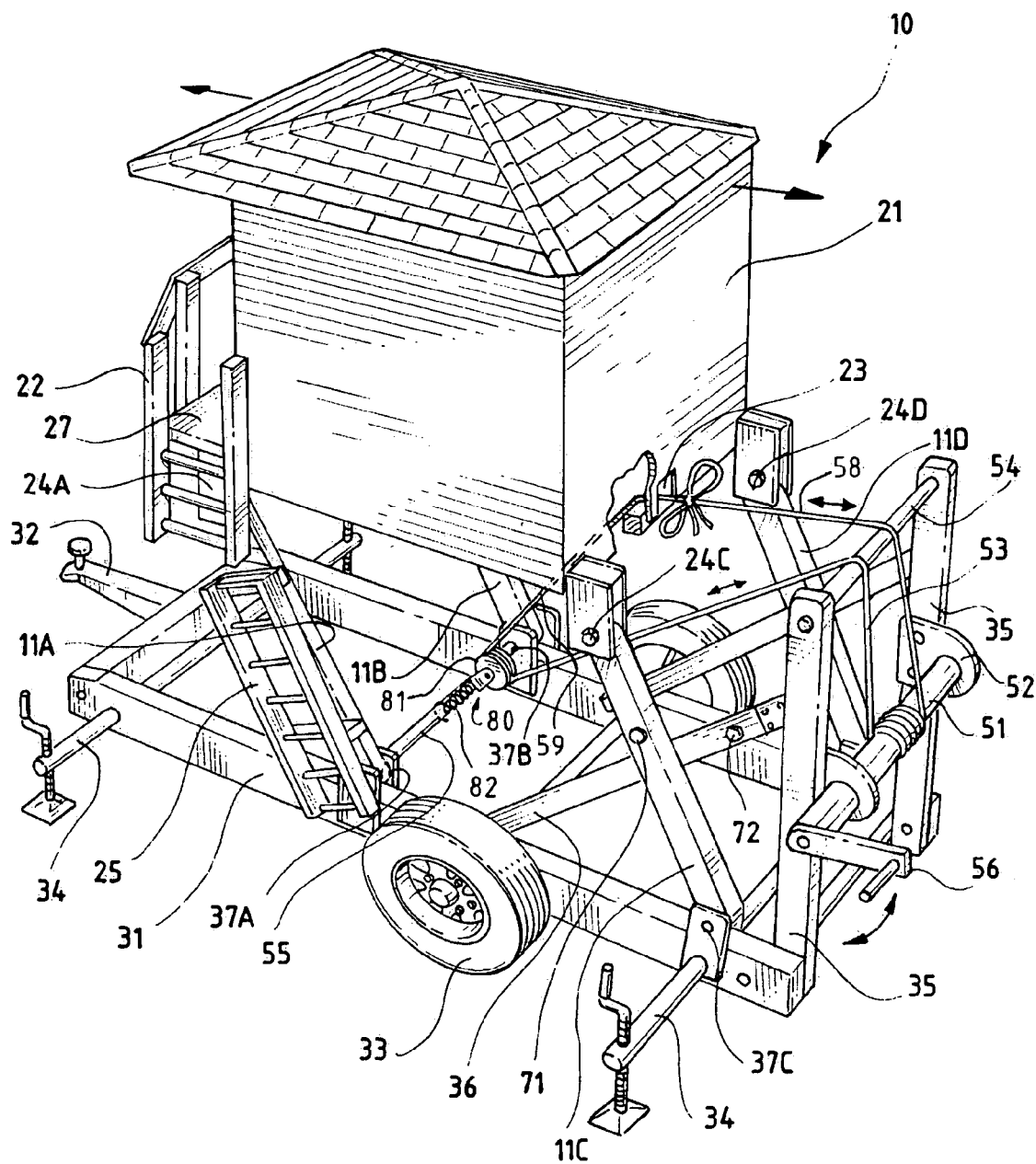
FIG. 1 is a perspective view of an embodiment of the product with the platform in an intermediate position.

The platform can have various configurations such as a simple flat surface, a sheltered surface, a work area, and an enclosed hut with a floor, walls, windows, and doors. As seen in FIG. 1, the platform can include an enclosed hut 21 and an external walkway 27.

The product can have means for accessing the platform. In the embodiment shown in FIG. 1, the means for accessing the platform is a two-section ladder. The upper ladder section 22 is fixed to the platform. The lower ladder section 25 is fixed to and rotates with a front leg 11A. As the platform approaches the raised position, the ladder sections converge to form a continuous ladder assembly for accessing the platform.

Alternatively, the means for accessing the platform can be a lift, a climbing rope, stairs, a ramp, and other means and combinations thereof.

The product has legs pivotally connecting the trailer and the platform. In the embodiment shown in FIG. 1, the legs comprise a first front leg 11A pivotally connected to a first platform point 24A and a first trailer point 37A, a second front leg 11B pivotally connected to a second platform point (not visible) and a second trailer point 37B, a first rear leg 11C pivotally connected to a third platform point 24C and a third trailer point 37C, and a second rear leg 11D pivotally connected to a fourth platform point 24D and a fourth trailer point (not visible.) The platform points and the trailer points can be on elements connected to the platform and to the trailer.

The product can have various numbers of legs, such as two, three, four, and more legs. Different leg configurations can be used, such as legs placed centrally between the front and rear sides of the platform, legs placed asymmetrically, and various other configurations.

The product has a lifter, in use acting between the trailer and the platform. The lifter provides energy for moving the platform with respect to the trailer.

The platform requires energy for moving the platform to the raised position. The energy for moving the platform to the raised position is hereinafter referred to as raising energy.

The platform requires energy for moving the platform away from the raised position. The energy for moving the platform away from the raised position is hereinafter referred to as lowering energy.

The lifter in use provides the raising energy for moving the platform to the raised position and provides lowering energy for moving the platform away from the raised position towards the lowered position.

In the raised position the platform is fully supported by the legs without support from the lifter. In the raised position, the platform has no tendency to move away from the raised position and requires lowering energy to move to another position.

The lifter can be connected between various elements of the product such as the legs, the trailer, and the platform. Different lifters can require dissimilar mounting positions in order to move the platform. For instance, a worm gear lifter that provides torque to move the platform can require a different mounting position than a winch that provides a force, via a cable, to move the platform.

In the embodiment shown in FIG. 1, the lifter is a bi-directional winch comprising a drum 51, a cable 53, and a handle 56. Various lifters, such as winches, worm gears, hydraulic and electric motors, hydraulic and pneumatic cylinders, and other devices can be utilized if they meet the operational requirements of providing raising energy and lowering energy.

In FIG. 1, the winch is mounted between mounting plates, such as the mounting plate 52. The cable 53 has a raising section 58 and a lowering section 59. The raising section 58 is defined as the portion of the cable, between the winch and the platform, which pulls the platform to the raised position. The lowering section 59 is defined as the portion of the cable, between the platform and the winch, which pulls the platform away from the raised position.

When the drum rotates, the cable wraps around the drum at one end of the drum and simultaneously unwraps from the drum at the other end. The cable wraps and unwraps, as the drum rotates, at substantially the same rate. This arrangement enables the winch, via the cable, to move the platform to the raised position and to move the platform away from the raised position towards the lowered position.

As the platform moves between the raised position and the lowered position, the raising section and the lowering section both change lengthwise. It is an unexpected discovery that they change lengthwise non-proportionally with respect to each other, that is, at different rates, while the platform moves. Since the raising section and the lowering section wrap and unwrap from the drum at substantially the same rate, means for compensating the lengthwise changes is needed to prevent the cable binding and slackening while the platform moves.

In order to accommodate non-proportional changing without binding and slackening, the embodiment shown in FIG. 1 further comprises a compensator connected to the lowering section and removing slackness from the lowering section.

Figure 3:
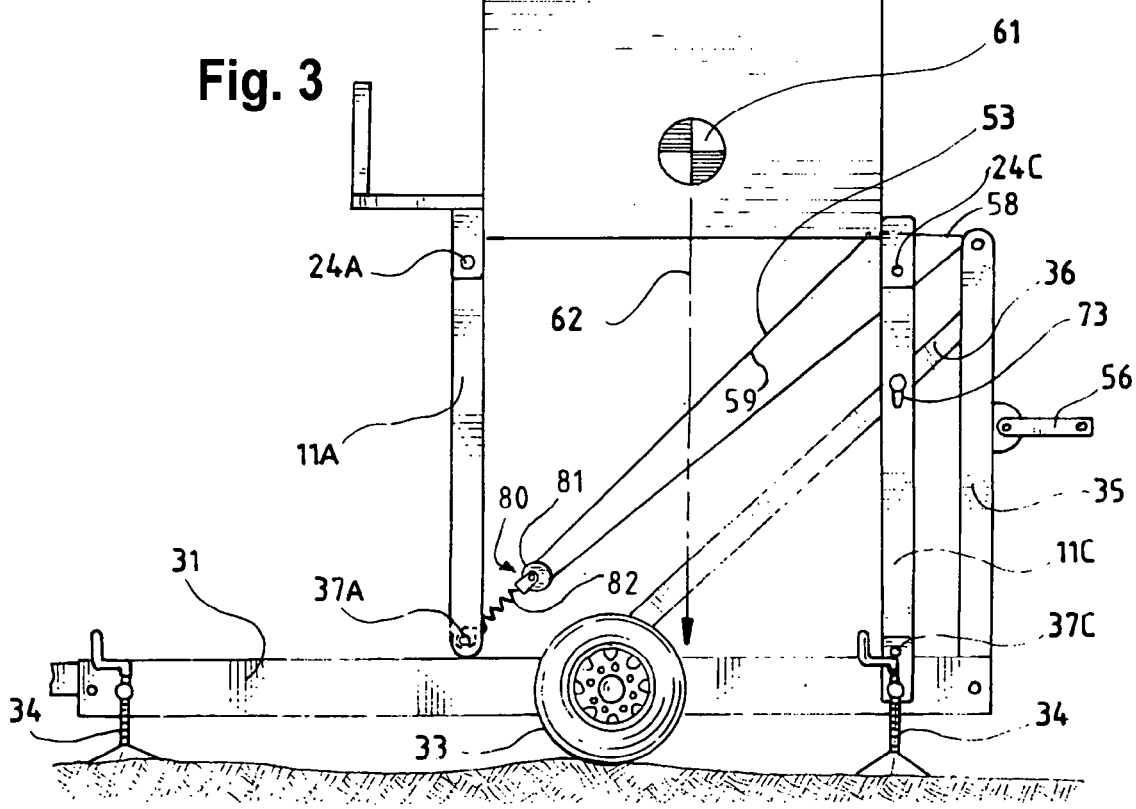
FIG. 3 is a side view of the embodiment of FIG. 1 showing the platform in a raised position.

As best seen in FIG. 3, the compensator 80 comprises a pulley 81 and a spring 82. The raising section 58 comes off the winch drum 51, wraps around the upper cable rod 54 and connects to the platform at the anchor point 23. The lowering section 59 comes off the winch drum 51, passes through the pulley 81 and connects to the platform at the anchor point 23. The pulley 81 positions the lowering section 59 so that the lowering section pulls the platform away from the raised position and towards the lowered position.

The compensator 80 extends and retracts to compensate for the lowering section changing lengthwise. This allows the platform to move at the rate that the raising section changes, regardless of the rate the lowering section changes.

The compensator can comprise a spring as shown in FIG. 1. Alternatively, the compensator can comprise a pneumatic cylinder, a hydraulic cylinder, a linear actuator, a rotary actuator, an elastic member, and various other slack-removing components. The compensator can comprise a combination of components.

In the embodiment shown in FIG. 1, when the platform is in the raised position, the action of the lowering section on the platform and the action of the raising section on the platform cancel each other and the platform is fully supported by the legs. As the platform reaches the raised position, or passes through the raised position, a tensioning shift occurs between the raising section and the lowering section. As the platform approaches the raised position from the lowered position, the raising section is pulling against the platform weight. As the platform passes through the raised position, the platform weight shifts to the lowering section. At the raised position, where the weight shift occurs, the actions of the lowering section and the raising section on the platform balance each other and the platform is fully supported by the legs.

The winch can have more than one cable providing raising and lowering energy for moving the platform.

The trailer can have an upright. The upright in use is upstanding from the trailer. The upright can provide a mounting position for the lifter and a connection point for locking the platform in place. The trailer can have more than one upright.

In FIG. 1, there are two uprights, placed on either side and to the rear of the trailer. The upright has a perpendicular member 35 and a diagonal member 36. Each upright shown in FIG. 1 provides a mounting position for a winch mounting plate, such as the winch mounting plate 52. Each upright shown in FIG. 1 supports the upper cable rod 54. Each upright can provide a locking hole 72 for locking a rear leg in place when the platform is in the raised position.

The upright can be foldable, collapsible, and removable to facilitate stowing during transport. The upright can be located in various positions, such as the front, the rear, centered, and asymmetric positions on the trailer. The upright can have various configurations, such as an A-frame and a single member upright.

The product can have a lock, in use locking the platform in a position, such as the raised position. In the embodiment shown in FIG. 3, the lock comprises a pin 73, inserted into a hole 71 through a rear leg and the hole 72 through the upright. The holes are shown in FIG. 1. When the platform is in the raised position, the holes align and the pin is inserted through the holes to lock the platform in the raised position. Various other locks and locking features can be used.

The lock can be comprised of the integral features of the platform, legs, and trailer. The lock can be comprised of standard parts such as bolts, padlocks, and hasps, specially designed parts, and combinations thereof.

Figure 2:
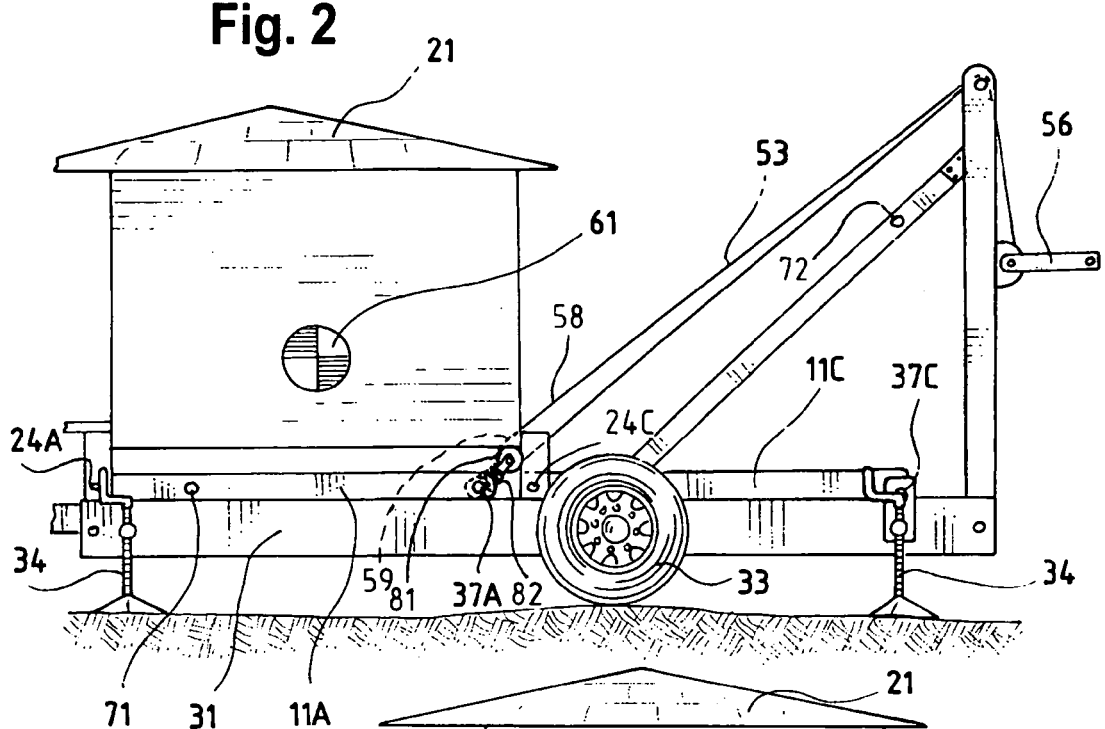
FIG. 2 is a side view of the embodiment of FIG. 1 showing the platform in a lowered position.

In the embodiment shown FIG. 2, the platform is shown in the lowered position. The lowered position can be a stable position for towing due to the lowered center of gravity. The platform can be locked to the trailer in the lowered position to facilitate towing.

In the embodiment shown in FIG. 1, the platform is shown in an intermediate position between the lowered and raised positions. In an intermediate position, the platform position is inherently unstable and requires energy acting against the force of gravity to hold the platform in the intermediate position. In the embodiment shown in FIG. 1, the lifter, in this case the winch provides the energy to hold the platform in the intermediate position.

In FIG. 3, the platform is shown in the raised position. In the embodiment shown in FIG. 3, the platform in the raised position is freestanding and fully supported by the legs. The platform has no tendency to move away from the raised position. When the platform is in the raised position, the gravity vector 62, shown passing through the platform center of gravity 61, is balanced by upward forces through the legs.

With the platform in the raised position the legs can be substantially vertical, as shown in FIG. 3. Alternatively, the legs can be nonvertical when the platform is in the raised position. Alternatively, some legs can be vertical and some legs can be nonvertical when the platform is in the raised position.

In the raised position, the legs fully support the weight of the platform. Each downward-directed weight force of the platform, transmitted to the legs through the connection points on the platform, is balanced by an equal, upward-directed reaction force transmitted from the legs through the connection points on the trailer.

Since all the forces are balanced, the platform in the raised position is freestanding and the platform has no tendency to move from the raised position. Lowering energy is required to move the platform to another position. The lowering energy can be provided by the lifter and it can be provided by wind loads, movement on the platform, accidental impact on the trailer, and other transient events.

The first platform point 24A, the first trailer point 37A, the third platform point 24C, and the third trailer point 37C are the four vertices of a closed figure. The closed figure can be a parallelogram. Alternatively, the closed figure can be a trapezoid with two parallel sides. Alternatively, the closed figure can have no parallel sides.

When the closed figure is not a parallelogram, the legs and pivot points can be configured so that the platform travels past a potential energy peak as it moves to the raised position at a lower potential energy position. In this case, the raised position is a meta-stable position wherein the platform tends to return to the raised position if it is displaced a small amount from the raised position.

The meta-stable raised position is more resistant the effects of shifting wind loads and the movements of people and objects on the platform. In the meta-stable raised position, the lifter provides sufficient lowering energy for the platform to overcome the potential energy peak, in order to move the platform away from the raised position.

What is claimed is:

1. A mobile elevating hut comprising:
   a trailer;
   a platform being movable between a raised position and a lowered position;
   a winch,
   the winch in use acting between the platform and the trailer;
   the winch having a cable with a raising section and a lowering section;
     the cable simultaneously wrapping and unwrapping from the winch at substantially the same rate;
   the winch in use providing raising energy, via the raising section, for pulling the platform to the raised position;
   the winch in use providing lowering energy, via the lowering section, for pulling the platform away from the raised position;
   a compensator removing slackness in the lowering section;
     the compensator extending and retracting in response to the lowering section changing lengthwise as the platform moves between the raised position and the lowered position;
   the platform having legs, the legs comprising:
     a front leg being pivotally connected to both the trailer and the platform;
     a rear leg being pivotally connected to both the trailer and the platform;
   the platform, in the raised position, being fully supported by the legs without substantial support from the winch.

2. The hut of claim 1 wherein the legs are substantially parallel with respect to each other.

3. The hut of claim 1 wherein the legs are substantially vertical when the platform is in the raised position.

4. The hut of claim 1 wherein the compensator comprises a spring.

5. A mobile elevating hut comprising:
   a trailer;
   a platform being movable between a raised position and a lowered position;
   a winch,
   the winch in use acting between the platform and the trailer;
   the winch having a cable with a raising section and a lowering section;
     the cable simultaneously wrapping and unwrapping from the winch at substantially the same rate;
   the winch in use providing raising energy, via the raising section, for pulling the platform to the raised position;
   the winch in use providing lowering energy, via the lowering section; for pulling the platform away from the raised position;
   a compensator removing slackness in the lowering section;
     the compensator extending and retracting in response to the lowering section changing lengthwise as the platform moves between the raised position and the lowered position;
   the platform having legs, the legs comprising:
     a first front leg being pivotally connected to both the trailer and the platform;
     a second front leg being pivotally connected to both the trailer and the platform;
     a first rear leg being pivotally connected to both the trailer and the platform;
     a second rear leg being pivotally connected to both the trailer and the platform;
   the platform, in the raised position, being fully supported by the legs without substantial support from the winch.

6. The hut of claim 5 wherein the legs are substantially parallel with respect to each other.

7. The hut of claim 5 wherein the legs are substantially vertical when the platform is in the raised position.

8. The hut of claim 5 wherein the compensator comprises a spring.

* * * * *